United States Patent
Weigand et al.

(10) Patent No.: US 9,143,515 B2
(45) Date of Patent: Sep. 22, 2015

(54) LOCATION-BASED REGULATION OF ACCESS

(75) Inventors: Gilbert G. Weigand, Ashburn, VA (US); Scott J. Levine, Arlington, VA (US)

(73) Assignee: GOOGLE INC., Mountain View, CA (US)

( * ) Notice: Subject to any disclaimer, the term of this patent is extended or adjusted under 35 U.S.C. 154(b) by 1145 days.

(21) Appl. No.: 12/786,037

(22) Filed: May 24, 2010

(65) Prior Publication Data

US 2010/0235508 A1 Sep. 16, 2010

Related U.S. Application Data

(63) Continuation of application No. 10/698,017, filed on Oct. 31, 2003, now Pat. No. 7,725,580.

(51) Int. Cl.
| | |
|---|---|
| *H04W 4/02* | (2009.01) |
| *H04L 29/06* | (2006.01) |
| *G06F 17/30* | (2006.01) |
| *H04L 29/08* | (2006.01) |
| *G11B 20/00* | (2006.01) |

(52) U.S. Cl.
CPC .......... *H04L 63/107* (2013.01); *G06F 17/3087* (2013.01); *G11B 20/0013* (2013.01); *G11B 20/0084* (2013.01); *G11B 20/00695* (2013.01); *G11B 20/00869* (2013.01); *H04L 67/18* (2013.01); *H04W 4/02* (2013.01); *H04W 4/021* (2013.01); *G11B 20/00086* (2013.01); *G11B 2220/2537* (2013.01)

(58) Field of Classification Search
CPC ....... H04L 63/107; H04L 67/18; H04W 4/02; H04W 4/021; G06F 17/3087
USPC .......................................................... 709/225
See application file for complete search history.

(56) References Cited

U.S. PATENT DOCUMENTS

| | | |
|---|---|---|
| 7,509,687 B2 | 3/2009 | Ofek et al. |
| 2002/0023010 A1 | 2/2002 | Rittmaster et al. |
| 2002/0087692 A1 | 7/2002 | Woods et al. |
| 2002/0154777 A1 | 10/2002 | Candelore |
| 2003/0120940 A1 | 6/2003 | Vataja |
| 2003/0188007 A1 | 10/2003 | Unger |
| 2003/0217122 A1 | 11/2003 | Roese et al. |
| 2003/0225863 A1 | 12/2003 | Kajino et al. |
| 2004/0010602 A1 | 1/2004 | Van et al. |
| 2004/0054920 A1 | 3/2004 | Wilson et al. |
| 2004/0117491 A1 | 6/2004 | Karaoguz et al. |
| 2004/0225894 A1 | 11/2004 | Colvin |
| 2005/0060405 A1 | 3/2005 | Nathan et al. |
| 2005/0086391 A1 | 4/2005 | Chu et al. |
| 2006/0031558 A1 | 2/2006 | Ortega et al. |

*Primary Examiner* — Aaron Strange
(74) *Attorney, Agent, or Firm* — Morris & Kamlay LLP

(57) ABSTRACT

Generally, access to content may be regulated by receiving a content request initiated at a jukebox for access to a content selection, identifying a jukebox location corresponding to a location of the jukebox, determining a permissible location for rendering the content selection, relating the jukebox location to the permissible location, and enabling the content request when the permissible location supports access to the content selection from the jukebox location.

20 Claims, 9 Drawing Sheets

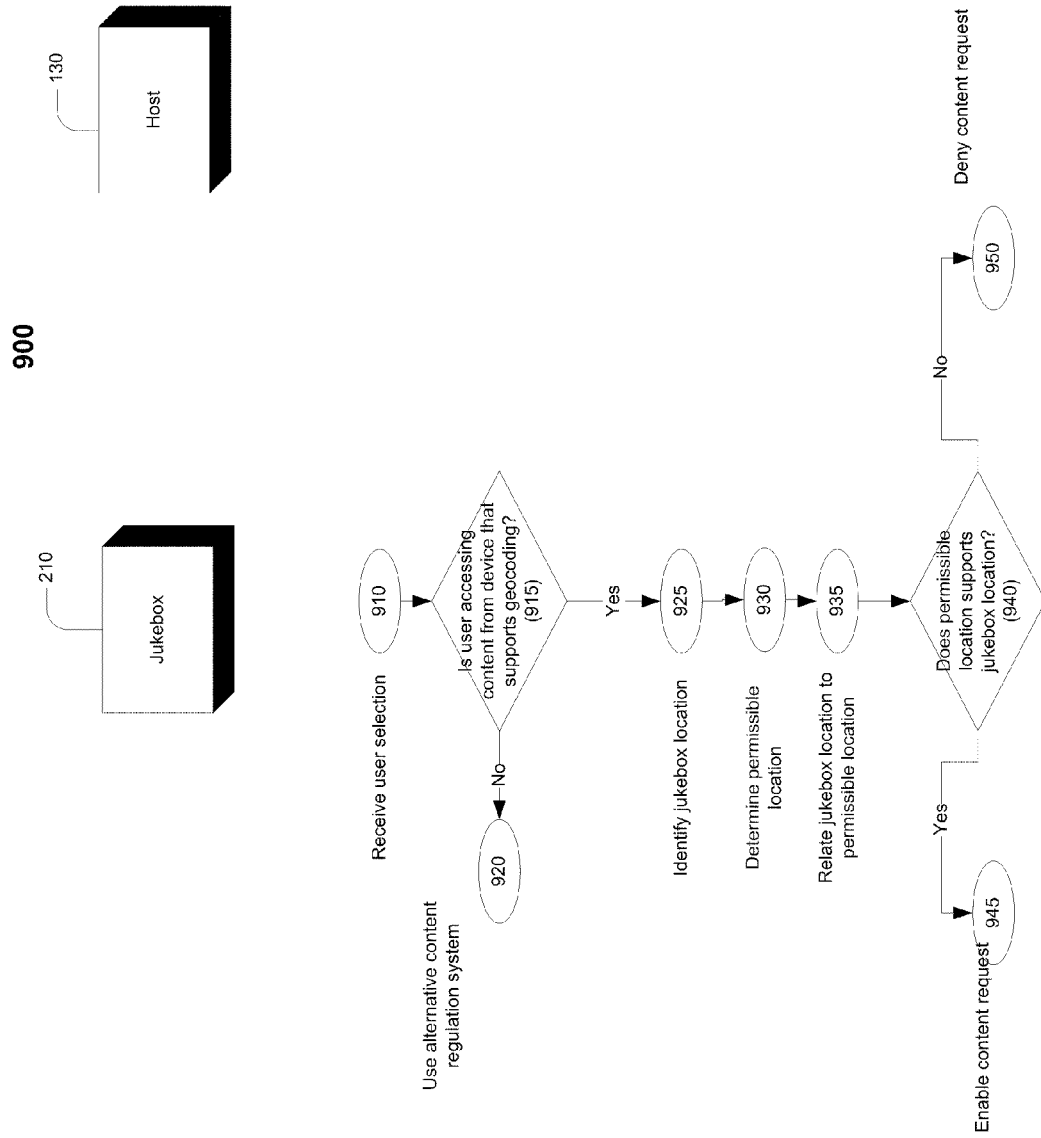

LOCATION-BASED REGULATION OF ACCESS

CROSS-REFERENCE TO RELATED APPLICATIONS

This application is a continuation of and claims priority to U.S. patent application Ser. No. 10/698,017, filed Oct. 31, 2003, titled "LOCATION-BASED REGULATION OF ACCESS," now U.S. Pat. No. 7,725,580. The contents of the prior application are incorporated herein by reference in their entirety.

TECHNICAL FIELD

This document relates to content management using location information.

BACKGROUND

Content is being accessed through an increasingly diverse array of devices. For example, a music selection may be enjoyed using an optical disk player that is part of a stereo system, or it may be enjoyed on a personal computer or small electronic device (e.g., a miniature jukebox) that accesses the music selection in a compressed digital format (e.g., MP3) from some form of local or hosted storage. While consumers enjoy using such a diverse array of devices, preventing unauthorized distribution of content can be difficult for content providers (e.g., record labels, artists, and service providers) as well as to manufacturers of consumer appliances.

SUMMARY

In one general sense, access to content may be managed by receiving a content request initiated at a jukebox for access to a content selection, identifying a jukebox location corresponding to a location of the jukebox, determining a permissible location for rendering the content selection, relating the jukebox location to the permissible location, and enabling the content request when the permissible location supports access to the content selection from the jukebox location.

Implementations may include one or more of the following features. For example, receiving a content request may include using the jukebox to read an optical disk to play the content selection, receiving a request from the user to download the content selection from a host, or reading a content label associated with access to an analog content selection. Receiving the content request may include decoding a publicly distributed signal.

Identifying the jukebox location may include using a Global Positioning System (GPS) receiver to determine the jukebox location associated with the jukebox accessing the content selection, or using network information associated with the jukebox generating the content request to identify the jukebox location. Using network information to identify the jukebox location may include correlating an Internet Protocol (IP) address with a geographical region that encompasses the jukebox. Identifying the jukebox location may include identifying a user identity associated with the user, correlating the user identity with billing information, and using the billing information to identify the jukebox location.

Determining the permissible location may include reading a location label associated with a medium that includes the content selection, the location label indicating a geographical region where the content selection may be used in the content request. Determining the permissible location may include polling a host to identify a geographic region where the content selection may be used in the content request.

Relating the jukebox location to the permissible location may include determining whether the jukebox location lies within a geographical region described by the permissible location. Determining whether the jukebox location lies within the geographical region may include determining whether the jukebox location lies within a predetermined distance of the permissible location.

The content request may be denied when the permissible location does not support using the jukebox location. The content request may be enabled for a limited period of time when the permissible location does not support using the jukebox location. The content request may be enabled for a limited class of content requests when the permissible location does not support using the jukebox location.

Enabling the content request for the limited class of content requests may include enabling read-only operations and denying copy operations. The content request may be enabled when the user registers to participate in a location-based content regulation system. An automated interface may be provided to enable the user to participate in the location-based content regulation system.

The details of one or more aspects are set forth in the accompanying drawings and the description below. Other features will be apparent from the description and drawings, and from the claims.

DESCRIPTION OF DRAWINGS

FIG. 9 is a flow chart illustrating exemplary processes by which a jukebox may process a content request in a content regulation system that selectively uses a location-based content regulation system.

DETAILED DESCRIPTION

Generally, a jukebox regulates access to content using location information. To illustrate, the jukebox may include an optical disk player with a GPS receiver. When a user attempts to play an optical disk using the optical disk player of the jukebox, the GPS receiver is used to determine the location of the optical disk player and hence the jukebox. Before, during or after this process, the optical disk player reads the optical disk to determine whether it specifies permissible or prohibited location(s) for accessing some or all selections on the optical disk, for example, the longitude and latitude coordinates of locations at which access is permitted to the optical disk. The permissible/prohibited locations are then compared to the jukebox location to determine whether to permit the attempted playback. For example, where the jukebox location is determined to be within a specified radius of a permissible location, the jukebox is allowed to play the optical disk or specific selection(s). By contrast, when the jukebox location is determined to be outside of the specified radius of the permissible location, the jukebox is not allowed to play the optical disk or specific selection(s).

Although this example describes a standalone jukebox, the jukebox may interface with a host to participate in a content regulation system. The host can be used as a content source or it may be used to distribute the content selection. Alternatively, the host can be used to perform one or more operations in selectively enabling access to the content selection. For example, the host may include a regulating code segment that decides whether the permissible location supports using the jukebox location, or the host may maintain and provide the permissible location for a content selection based on an identifier corresponding to the content selection.

In a framework of multiple content regulation systems, the jukebox may be used to enroll a content selection in a location-based content regulation system and also to selectively participate in the location-based content regulation system. For example, the jukebox may write a permissible location to an optical disk that includes the location of the jukebox accessing the optical disk so that subsequent access to the optical disk may be restricted to the location of the jukebox used to initially access the optical disk. Furthermore, these location-based implementations and concepts may be combined with, or enhanced or replaced by, other content-based regulation systems when the jukebox or content is being operated in an environment where other systems provide reliable content regulation.

Figure 1:
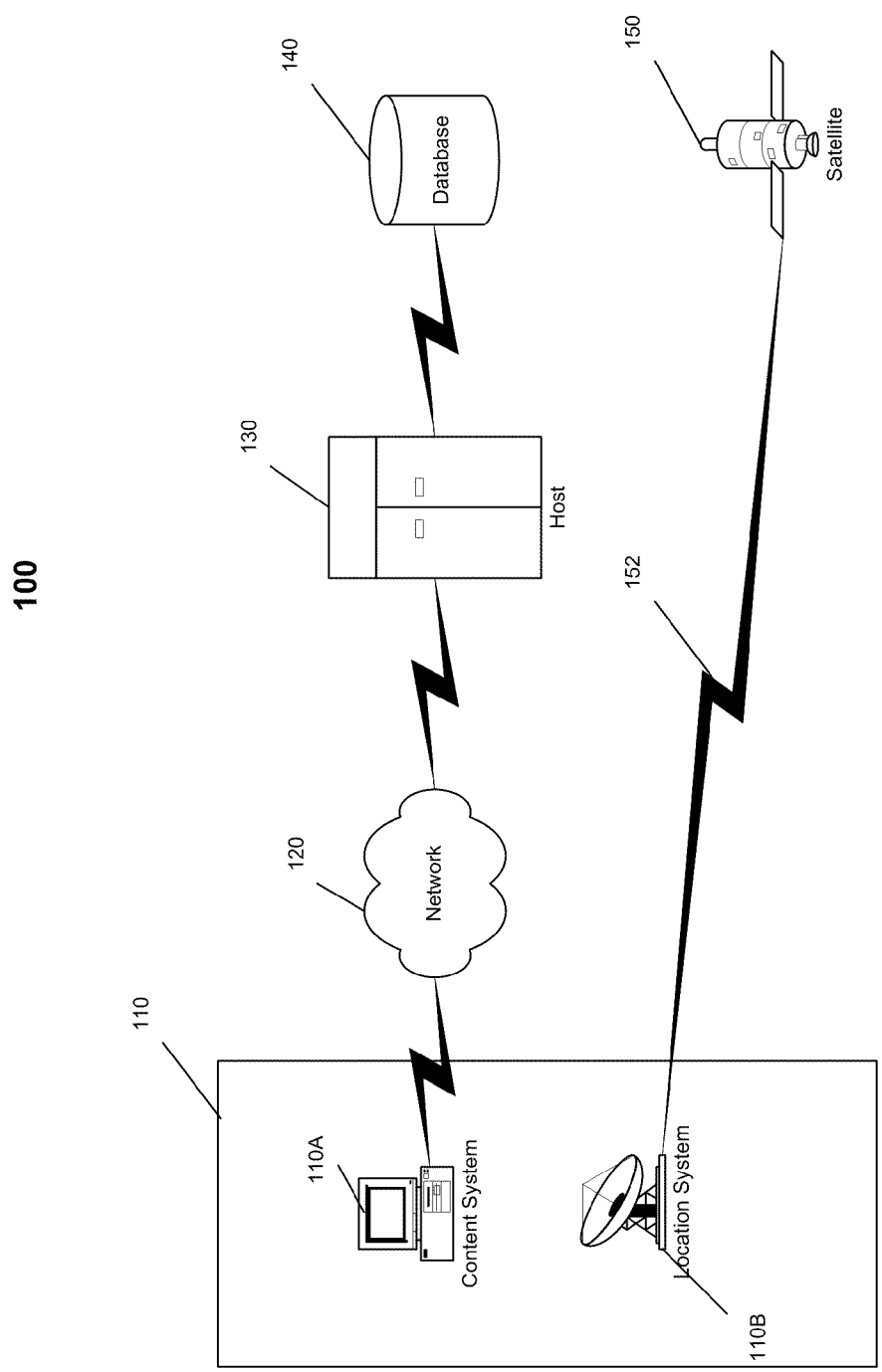
FIG. 1 is a diagram of an exemplary jukebox in an exemplary communications network configured to regulate access to content using location information.

Referring to FIG. 1, an exemplary communications system 100 is shown enabling an exemplary jukebox 110 to regulate access to content using location information. The jukebox 110 may (1) administer the location-based content regulation system; (2) determine location information; and (3) access one or more selections of content such as digitally encoded songs or videos. The jukebox 110 also may receive location information from other geopositioning systems, as is shown by the satellite 150. Although the jukebox 110 is shown in a communications system 100, the jukebox 100 need not interface with the host 130. For example, the jukebox 110 may administer a location-based content regulation system without using a host when an optical disk is encoded with the permissible location.

The jukebox 110 is an automated appliance enabling access to one or more selections of content using location information. The jukebox 110 may encompass a diverse body of appliances and access content using a variety of techniques.

For example, the jukebox 110 may include a personal computer (PC), an optical disk player, an audio consumer electronic appliance, a miniature audio system, a car stereo, or other device or appliance enabling a user to access a content selection, whether provided manually or electronically. The content may be accessed by various means, including reading an optical disk, accessing a hard drive or other form of magnetic media used to store content, retrieving a content selection from a network, decoding or decrypting publicly distributed content from the airwaves, and reading an analog medium used to display content (e.g., a film projector).

As is shown in FIG. 1, the jukebox 110 includes a content system 110A and a location system 110B. The jukebox 110 is structured to receive a content request using the content system 110A. The jukebox 110 then processes the content request using information received from the location system 110B in determining whether to enable the content request. Generally, the content system 110A enables a user to initiate a content request to access a piece of content. For example, the content system 110A may include a keypad enabling the user to select a track on an optical disk to play. The content system 110A accesses the optical disk and retrieves information related to the content selection so that the jukebox 110 may selectively enable access to the content selection.

The content system 110A may include a communications interface enabling the jukebox 110 to access a network 120. The content system 110A may use the network 120 to interface with other systems such as host 130 and database 140 in enabling access to content using location information. In one example, the content system 110A uses the communications interface to retrieve content. In another example, the content system 110A uses the communications interface to participate in a content regulation system that selectively enables access to content. In yet a third example, the content system 110A uses the communications interface to receive location information (e.g., permissible location(s) for accessing selected content) used by the jukebox in participating in a location-based content regulation system. As an alternative to this third example, the content system 110A includes a processor that decodes location information related to content that is being accessed. For example, the location system 110B may read a band of location information on an optical disk.

The location system 110B is configured to determine or enable determination of the location of the jukebox 110. The jukebox 110 may use the location determined by or through location system 110B to enable selective access to content. In one example, the location system 110B includes a GPS ("Global Positioning System") receiver that determines the location of the jukebox 110 to which the location system 110B is connected. In another example, the jukebox location system 110B may interface with network 120 to receive information indicating or concerning the location of jukebox 110 (e.g., by measuring network distance in terms of number of hops). The location of the jukebox 110 then may be used in selectively enabling access to content. As an alternative to the third example, the location system 110B includes a processor that decodes location information related to content that is being accessed. For example, the location system 110B may read a band of location information on an optical disk.

The jukebox 110 also may include and run one or more software applications. For example, the jukebox 110 may run a software application such as a rights access program, configured to administer a content regulation program. The rights access program may be used to determine an access right for the content. Other software applications on the jukebox 110 may include a software application configured to render content information (e.g., a cover, lyrics, artist information, and/or purchasing information for the content). Although the jukebox 110 in one sense may relate to other consumer appliances, such as a CD player and/or a DVD player, the jukebox 110 also may relate to more flexible electronic equipment such as a personal computer. For example, a computer may be configured as a stereo system that runs a general-purpose operating system with one or more media applications operating on a general operating system and a general-purpose processor. Additionally, the computer may be configured to respond to controls such as those typically found on a stereo system (e.g., a volume control dial).

The network 120 includes hardware and/or software capable of enabling direct or indirect communications between the jukebox 110 and the host 130. As such, the network 120 may include a direct link between the jukebox 110 and the host 130, or it may include one or more networks or subnetworks between them (not shown). Each network or subnetwork may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

One example of a host 130 is a general-purpose computer (e.g., a server) capable of responding to and executing instructions in a defined manner. Other examples include a personal computer, a special-purpose computer, a workstation, a device, a component, other equipment, or some combination thereof capable of responding to and executing instructions. The host 130 may include and/or form part of an information delivery network, such as, for example, the Internet, the World Wide Web, an online service provider, and/or any other analog or digital wired and/or wireless network that provides information. Such information delivery networks may support a variety of online services, including Internet and/or web access, e-mail, instant messaging, paging, chat, interest groups, audio and/or video streaming, and/or directory services.

The host 130 may receive instructions from a software application, a program, a piece of code, a device, a computer, a computer system, or a combination thereof that independently or collectively directs operations of the node. The instructions may be embodied permanently or temporarily in any type of machine, component, equipment, storage medium, or propagated signal that is capable of being delivered to the host 130.

In one implementation, the host 130 includes one or more information-providing software applications for accessing and transmitting requested files to the jukebox 110. The information-providing applications may run on a general-purpose operating system and a hardware platform that includes a general-purpose processor and/or specialized hardware. Another implementation may include a reduced operating system with both general purpose and specialized hardware to operate in mobile environments.

The database 140 may include one or more systems enabling the host 130 to support information retrieval operations for the jukebox 110. In one implementation, the database 140 includes a licensing library enabling the host 130 to administer a content regulation system. The licensing library may associate one or more selections of content with a user identity and/or location information regulating where the content may be accessed.

In another implementation, the database 140 includes a content library enabling the host 130 to retrieve a content selection. For example, the database 140 may include a volume of digitally encoded songs that the user may be allowed to download. The host 130 may retrieve the songs from the database 140 and encode the songs so that the songs are selectively accessible from a location associated with the user.

The database 140 may include a table that relates a content identifier to permissible locations. Thus, a first content selection may be accessible from a first location while a second content selection may be accessible from a second location. A content administrator (e.g., a clerk at a retail content outlet such as a video store, or an online content administrator for the host 130) may modify one or more records, as required, to update the permissible locations and/or manage the list of content identifiers.

Satellite 150 illustrates a location signal provider enabling the jukebox 110 to regulate access to content using location information. The satellite 150 may include one or more GPS or Magellan (European) satellites providing location signals 152. The location signals may be processed by a location system 110B so that the jukebox may determine a jukebox location. Although a satellite 150 is shown as providing the location signal, other systems may be used to provide a location signal. For example, a location signal may be provided over a communications network such as the Internet, in addition to a land-based location signal provider.

Figure 2:
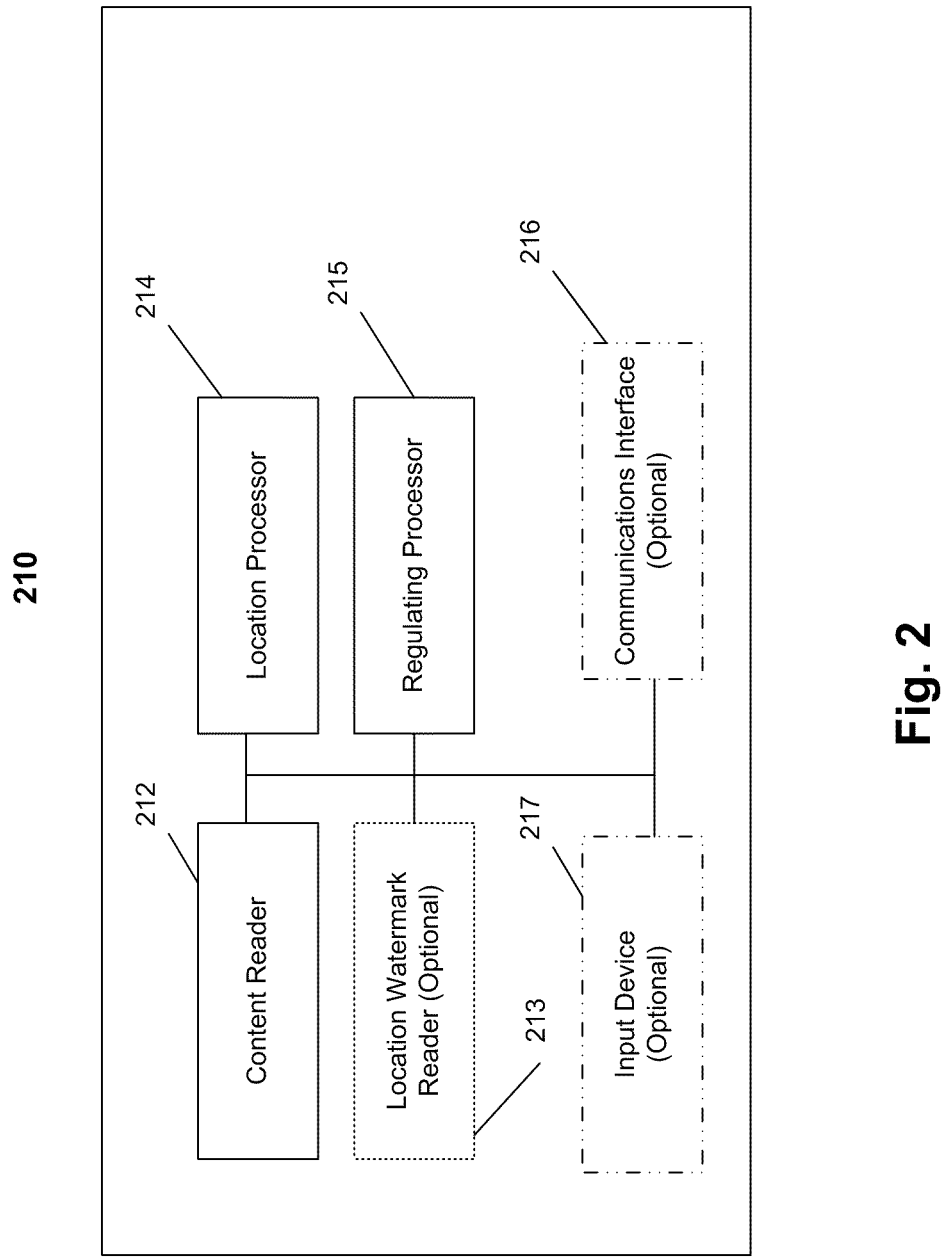
FIG. 2 is a block diagram of an exemplary jukebox that uses location information to access content.

FIG. 2 illustrates a block diagram of an exemplary jukebox 210 that may be used to regulate access to content using location information. For ease of discussion, particular components described with respect to FIG. 1 are referenced in describing jukebox 210. However, similar structures may be applied in other implementations where different components are used to define the structure of the system, or where the functionality is distributed differently among the components shown by FIG. 1. Jukebox 210 illustrates a configuration used to process a content request. As shown, the jukebox 210 includes a content reader 212, an optional location watermark reader 213, a location processor 214, a regulating processor 215, an optional communications interface 216, and an optional input device 217. Generally, the jukebox 210 is configured to use content reader 212 to read a medium when accessing a content selection in response to a content request. The location watermark reader 213 then determines a permissible location related to the content selection. The location processor 214 determines the jukebox location. The regulating processor 215 then relates the permissible location to the jukebox location and selectively enables the content request when the permissible location supports using the jukebox location in executing a content request.

Generally, the content reader 212 includes a system, device, or code segment structured to receive and process a content request by requesting or accessing a content selection. Typically, the content reader 212 receives a user selection, for example, from the optional input device 217, to play or copy a content selection by reading a medium where the content selection is located. For example, the content reader 212 may include an optical disk reader that reads an optical disk to retrieve a content selection. The content reader 212 is not limited to an optical disk player, nor is the content reader limited to accessing a particular form of content such as audio or video content. For example, the content reader 212 may include a film projector accessing a film reel display system, or PC accessing a computer game. The content reader 212 also may access one or more selections of content that do not reside on the jukebox 210. For example, the content reader 212 may use the communications interface 217 to access selections of content hosted on a network.

The location watermark reader 213 determines a permissible location related to the content selection. For example, the location watermark reader 213 may read location information residing on a medium the content reader 212 is accessing. In particular, an optical disk may include one or more parameters indicating one or more locations where the content may be accessed. Alternatively, the location watermark reader 213 may poll the host to determine a permissible location.

The location watermark reader 213 may use different formats to represent the permissible location. In one example, the location watermark reader 213 may use a longitude/latitude coordinate system to indicate where the content selection may be accessed. In another example, the location watermark reader 213 may use a mailing address (e.g., street address, city, state, and zip code) or region (e.g., zip code, county) to indicate where the content selection may be accessed. The location watermark reader 213 also may use a modifier indicating a margin of error, radius, or zone around an identified location in which the content request may be performed. In one example, the modifier includes a radius around an identified longitude/latitude to describe a permissible location where content request may be supported. In another example, the modifier includes a non-uniform region describing where the content may be accessed (e.g., a plot of property or a zip code). The location watermark reader 213 may read a modifier supplied by the content, the jukebox 210, and/or the host 130. For example, the location watermark reader 213 may read modifier information in the same read operation used to identify a location in reading an optical disk. Alternatively, the location watermark reader 213 may be configured to use a modifier configured for the jukebox 210. For example, the location watermark reader 213 may be configured to use a modifier with a radius of 100 meters. The location watermark reader 213 may be configured to use the communications interface 216 to receive modifier information from a host (e.g., host 130).

The location watermark reader 213 may use different modifiers based on the content selection being accessed. For example, a digital film projector accessing a digital film for a prerelease event may use a restrictive modifier to preclude inappropriate or unauthorized use. In contrast, promotional material being widely distributed may use a modifier that enables access to the content selection in a much larger geographic region.

The location processor 214 includes a system, device, or code segment that determines a jukebox location for the jukebox 210 where the content request is being executed. For example, the location processor 214 may include a GPS receiver that provides GPS coordinates for the jukebox 210. The location processor 214 may use a variety of formats to describe the jukebox location, including geographic formats described with respect to the location watermark reader 213. For example, the location processor 214 may use a mailing address or identify a region to describe the jukebox location. However, the location processor 214 need not use the same format used by the location watermark reader 213. Thus, the location watermark reader 213 may use a mailing address, while the location processor 214 uses GPS coordinates (e.g., longitude and latitude).

The location processor 214 may use a communications interface 216 to identify a jukebox location. For example, the location processor 214 may exchange information with a host 130 to identify the jukebox 210. In one instance, the location processor provides a serial number for the jukebox 210. The host (e.g., host 130) may receive the information, process the information, and return a jukebox location for the jukebox 210. Thus, the host (e.g., host 130) may correlate a jukebox serial number with a customer account, correlate the customer account with a billing address, and return the billing address to the jukebox 210. In another example, the host (e.g., host 130) may analyze an IP ("Internet Protocol") address used by the jukebox, correlate the IP address with a geographic location or a region, and return the geographic location or region as a jukebox location.

The regulating processor 215 includes a system, device, or code segment that relates the permissible location with the jukebox location. By relating the permissible location to the jukebox location, the regulating processor 215 may selectively regulate access to the content selection. When the regulating processor 215 determines that the jukebox 210 (e.g., the jukebox location) is located within a region allowed for by the content (e.g., the permissible location), the regulating processor 215 may enable access to the content selection. When the jukebox 210 lies outside the region allowed for by the content, the regulating processor 215 may deny access to the content selection.

Of course, more precise and granular regulating operations may be supported. For instance, the regulating processor 215 may allow "play" or "read" operations to be performed but deny "copy" operations when the permissible location does not support the jukebox location. In another instance, the regulating processor 215 may allow access to the content for a limited period of time. Thus, the regulating processor 215 may allow the content to be accessed for a limited time when initially accessing a content selection. At the expiration of the limited time, the regulating processor 215 may be further limit or deny access to the content unless the user has registered to participate in a content regulation system (e.g., a license management program). The regulating processor 215 may use the communications interface 215 to receive updates or messages related to participation in a content regulation system.

An optional communications interface 216 enables the jukebox 210 to use network to exchange information with a host or database. For instance, with an optional communications interface 216, network 120, host 130 and database 140 may be used by jukebox 210 for information exchange. The communications interface 216 may exchange information to manage a content regulation, access content, or provide user services.

The communications interface 216 need not use two-way communications. For example, the communications interface 216 may be used to receive over-the-air rekeying and licensing information to configure the jukebox 210.

Although the jukebox 210 may include a communications interface 216, the jukebox 210 also may be configured to operate as a standalone system. Thus, the jukebox 210 may include an optical disk player that uses a GPS receiver and location information on an optical disk in regulating selective access to content.

The jukebox 210 also may include an optional input device 217. In one implementation, the input device 217 may include controlling buttons to access an optical disk (e.g., PLAY, FAST FORWARD, REWIND, Next-Track, Previous Track). The input device 217 may include specialized keys to support location services. For example, the input device 217 may include keys that write location information to the disc to bind a particular permissible location for a content selection to a jukebox location. Thus, the input device 217 could be used to receive a medium that has not been formatted for a location, and format the medium to one or more locations.

The input device 217 may include other forms of devices. In one implementation, a keyboard may be used enabling the user to register and participate in a content regulation system. In another implementation, a pointer may be used to control a selection icon appearing in a LCD ("Liquid Crystal Display").

Figure 3:
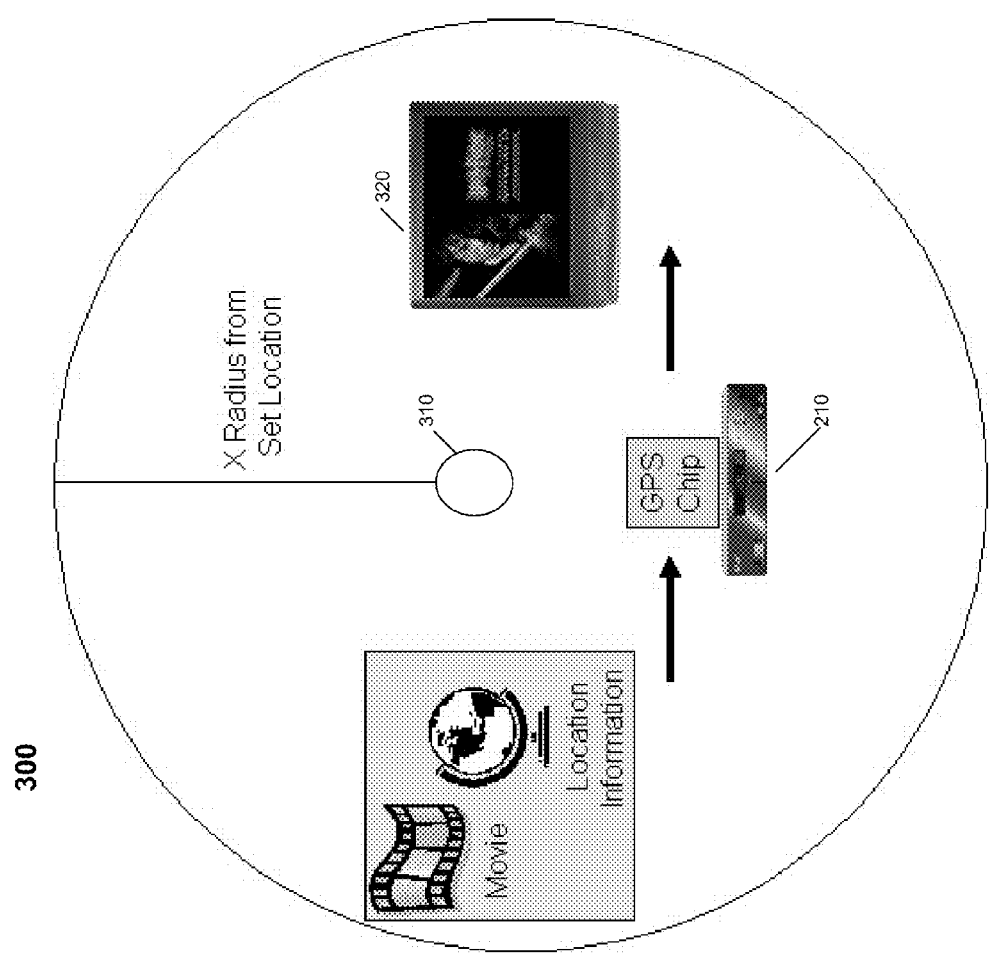
FIG. 3 illustrates an exemplary topology where a jukebox may be allowed to access content using location information.

Referring to FIG. 3, an exemplary topology 300 illustrates how access to content may be enabled when the location for a jukebox 210 lies within a radius of a permissible location for a content selection. For ease of discussion, particular components described with respect to FIG. 1 are referenced in describing topology 300. However, similar methodologies may be applied in other implementations where different components are used to define the structure of the system, or where the functionality is distributed differently among the components shown by FIG. 1. Topology 300 illustrates a configuration where the jukebox location supports access to content.

In topology 300, a jukebox 210 resides within a radius (e.g., the modifier for location watermark reader 213) allowed for by the permissible location 310 for the content selection. The jukebox 210 is shown as using a GPS receiver to determine a jukebox location. Since the jukebox location lies within the region allowed for by the permissible location, display device 320 is enabled to display content, which in this case includes a movie.

Figure 4:
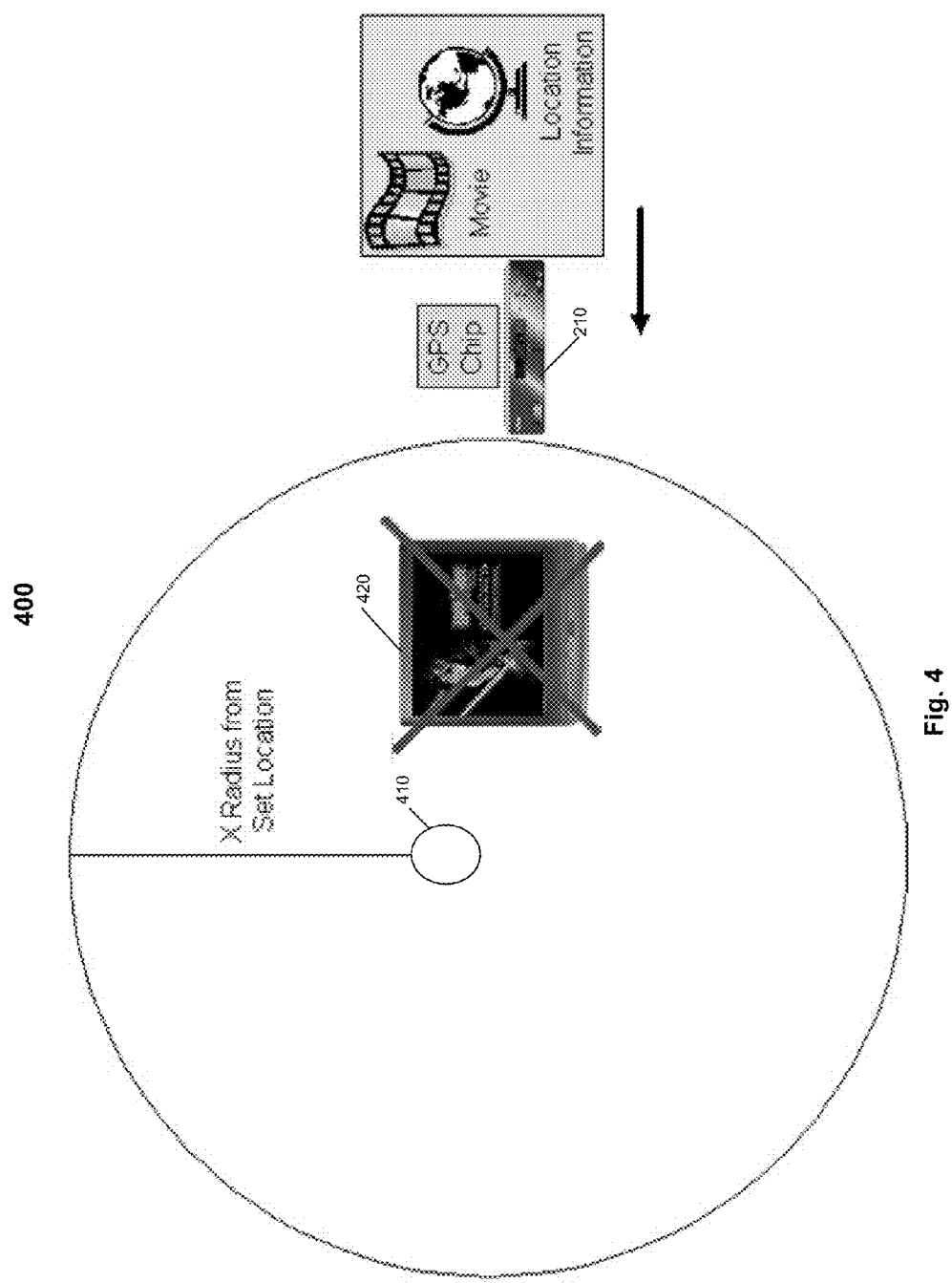
FIG. 4 illustrates an exemplary topology where a jukebox is not allowed to access content using location information.

In contrast, FIG. 4 illustrates an exemplary topology 400 where the permissible location 410 does not support the jukebox location. Specifically, the jukebox 210 reads a permissible location 410 for the movie being accessed. Since the jukebox location lies outside of the permissible location 410, the content request for the jukebox 210 is denied, and the display device 420 does not display the movie.

Figure 5:
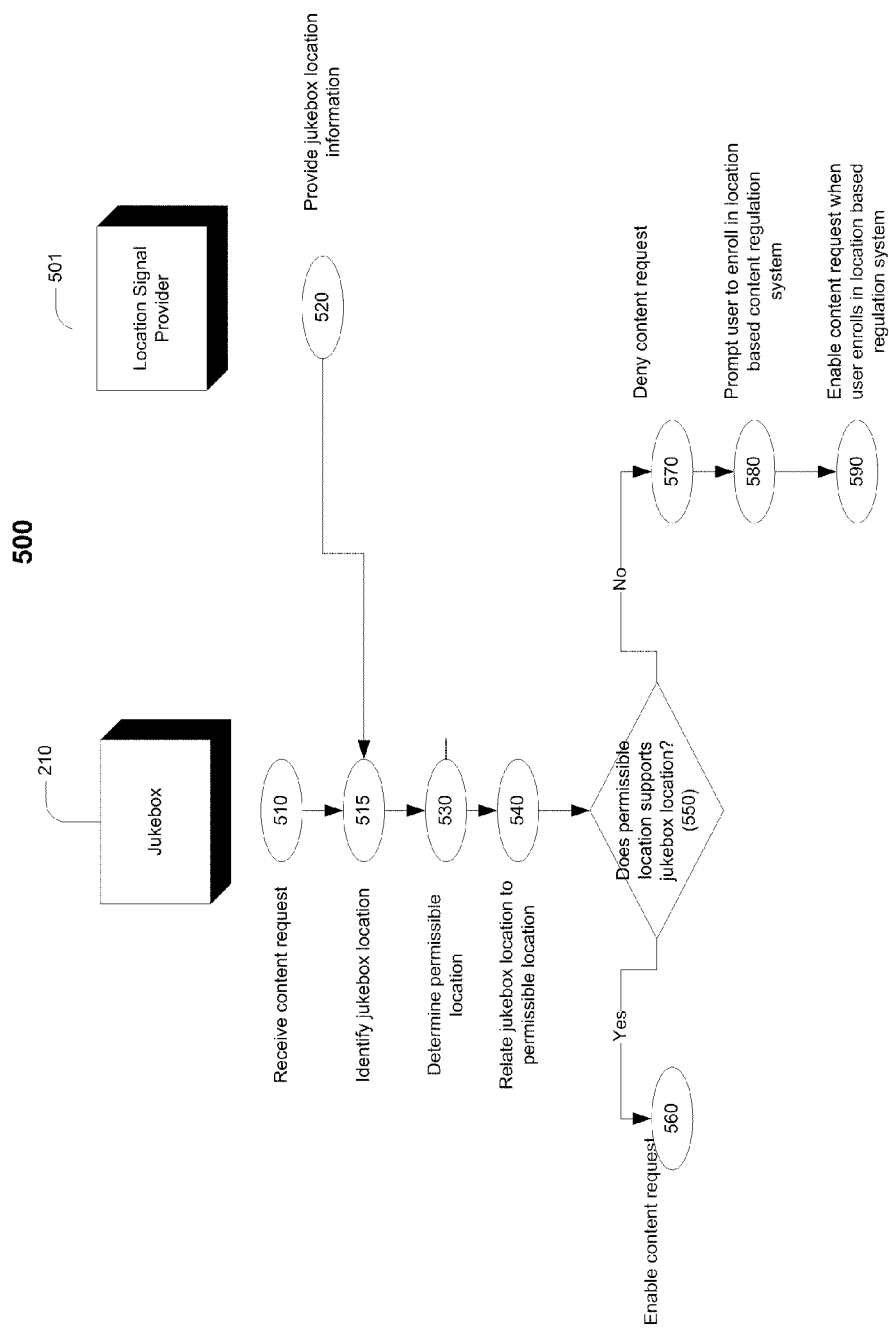
FIG. 5 is a flow chart illustrating an exemplary process by which a jukebox may regulate access to content using location information.

Referring to FIG. 5, flow chart 500 illustrates an exemplary process by which a jukebox 210 may regulate access to content using location information. For ease of discussion, particular components described with respect to FIG. 1 are referenced as performing the operations shown in flow chart 500. However, similar methodologies may be applied in other implementations where different components are used to define the structure of the system, or where the functionality is distributed differently among the components shown by FIG. 1. Flow chart 500 illustrates how the systems described previously may operate in regulating access to content based on location.

Initially, a jukebox 210 receives a content request (510). In one example, receiving a content request includes reading an optical disk in an optical disk player and receiving a "play" command (e.g., by pressing play) read a content selection. In another example, receiving a content request may include receiving a user request to download a content selection from a host 130 on the Internet.

The jukebox 210 identifies a jukebox location (515). Generally, identifying a jukebox location may include identifying geographic region or location where the jukebox 210 is processing the content request. Identifying a jukebox location may be performed by receiving a jukebox location from a location signal provider (520). This may include, for example, receiving one or more GPS signals and using a GPS receiver to determine the location of the jukebox. In another example, identifying a jukebox location may include exchanging information with a host 130 to determine a jukebox location.

The jukebox 210 determines a permissible location (530). For example, determining a permissible location may include reading a medium with an optical disc describing where the content selection may be accessed. Determining a permissible location may include identifying a coordinate location, and then identifying a region or region within a radius around the coordinate location. In one example, determining a permissible location may include receiving permissible radius or region information from the jukebox. Thus, determining a permissible location may include identifying a region that is within a specified distance of a coordinate location. This region may include, but is not limited to, a circular region defined by a radius, a particular address or street, or a plot of property. Identifying a permissible location may include translating location information from one format to another format. For example, identifying a permissible location may include receiving GPS coordinates and associating the GPS coordinates with a street address. Identifying the permissible location then may include using a street address as the permissible location.

Identifying a permissible location may include identifying a permissible location that varies with the operation being performed. Thus, when a content request includes a request to play a content selection, a radius around a coordinate location may be used. The radius may encompass several street addresses. When the content request includes a request to copy a copy selection, the copy operation may be limited to a smaller geographic region, such as a single street address, a particular set of location coordinates, or a region with a smaller radius.

Identifying the permissible location may include identifying a user-selected region, a player-defined region, a media/disk-defined region, and/or an industry standard. Identifying a user-selected region as the permissible location may include a permissible location specified when a user purchases a content selection. For example, a user may download or order a content selection from an Internet-based retailer. In purchasing the content selection, the address of the purchasing user may be used to specify the permissible location. In another example, the user may specify a location, region, or geographic footprint where the user may use the content selection. For example, a user may purchase a restricted license to access licensed content (e.g., a content selection such as an executable program) in a limited manner. A less restrictive license may be purchased to access the licensed content in a less restrictive manner. Thus, the restricted license may be limited to a particular street or county while a less restrictive license sold as a premium license may be used across multiple counties, a state, or nationally.

The permissible location may be associated with a user identity. A first user identity may be associated with a restricted permissible location while a second user may be associated with a less restricted permissible location. The first user may include a recipient of promotional material mailed to a particular address while the second user may include a user that has purchased the promotional material. Accordingly, the access rights of the first user may be limited to reduce the likelihood of misuse of the promotional material while the second user may enjoy increased access to reduce the likelihood of problems associated with an overly restricted access.

The jukebox relates the jukebox location to the permissible location (540). The jukebox 210 then determines if the permissible location supports the jukebox location (550). For example, the jukebox 210 may determine if the jukebox 210 lies within a region described by the optical disc. Although relating the permissible location to the transaction orientation may include a binary response indicating whether or not the transaction supports permissible location, relating the jukebox location to the permissible location may include scoring a relative proximity. Using a relative proximity may allow a licensing manager to develop a profile before implementing a rule set and also to tailor the proximity to various demographics. For example, some geographic regions may require a higher geographic allowance to accommodate various user activities. In contrast, other regions may allow a license manager to reduce the size of the permissible location to accommodate dense population densities. Still other examples may allow a license manager to review the impact of various proposed rule sets to decide how the location-based content regulation system may operate. For example, the license manager may receive reports of content requests and receive analytic reports of the jukebox operations (e.g., 75% of users operate within 50 meters of the permissible location). The license manager then may use an automated tool to review the impact to users of using a different radius to define a permissible location. Thus, the license manager may avoid implementing a rule set that would result in an excessive failure rate.

If the permissible location does support the jukebox location, the jukebox 210 may enable the content request (560). If not, the jukebox 210 denies the content request (570).

The jukebox 210 may prompt the user to enroll in the location based content regulation system (580). For example, a PC user who has been deemed access may be asked to use an online registration form to enroll or otherwise enable access. Similarly, a user of an optical disk drive may be asked to initialize a medium with the content selection so that the permissible location becomes that of the present operating location of the optical disk player when the optical disk player is initialized. Thus, in one exemplary use, instances of the content selection may be widely distributed without requiring that the instances be associated with a particular location in advance. To prevent the instances from being improperly used, access to the content may be restricted (e.g., the content may be played a limited number of times) until the user enrolls in a location-based content regulation system. When the user enrolls in the location-based content regulation system, the content request may be enabled (590).

Figure 6:
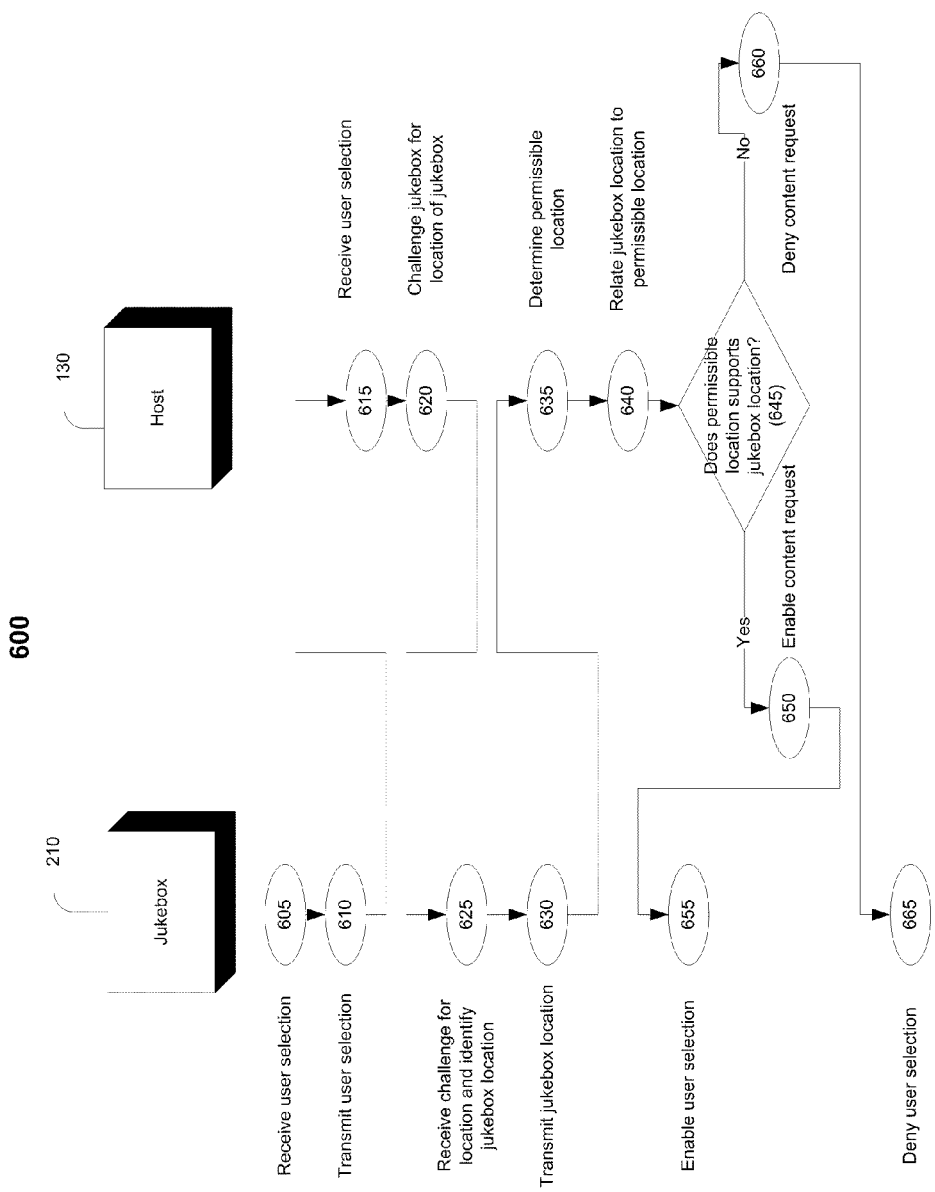
FIG. 6 is a flow chart illustrating an exemplary process by which a jukebox may interface with a content provider to secure access to content in a location-based content regulation system.

Referring to FIG. 6, a flow chart 600 illustrates an exemplary process by which a jukebox 210 may interface with a host 130 to participate in a location-based content regulation system. For ease of discussion, particular components described with respect to FIG. 1 are referenced as performing the operations shown in flow chart 600. However, similar methodologies may be applied in other implementations where different components are used to define the structure of the system, or where the functionality is distributed differently among the components shown by FIG. 1. The flow chart 600 illustrates how the host 130 may decide whether to enable the content request.

Initially, the jukebox 210 receives and transmits a user selection (605 and 610). This may include the user of a network-enabled optical disk drive pressing play when accessing an optical disk. The user selection then may be structured as a content request. The host 130 receives the user selection (615). Receiving the user selection may include receiving a description of the content request (e.g., the name or serial number of the content selection) and a user identifier. The host 130 challenges the jukebox 210 for the location of the jukebox 210 (620). The jukebox 210 receives the challenge and identifies a jukebox location (625). The jukebox 210 transmits the jukebox location (e.g., the jukebox location) to the host 130 (630).

The host 130 determines the permissible location for the content request (635). The jukebox 210 relates the permissible location to the jukebox location (640) and determines if the permissible location supports the jukebox location (645). If so, the host 210 enables the content request (650). In turn, the jukebox enables the user selection (655). If not, the host 130 denies the content request (660). As a result, the jukebox 210 denies the user selection (665).

Figure 7:
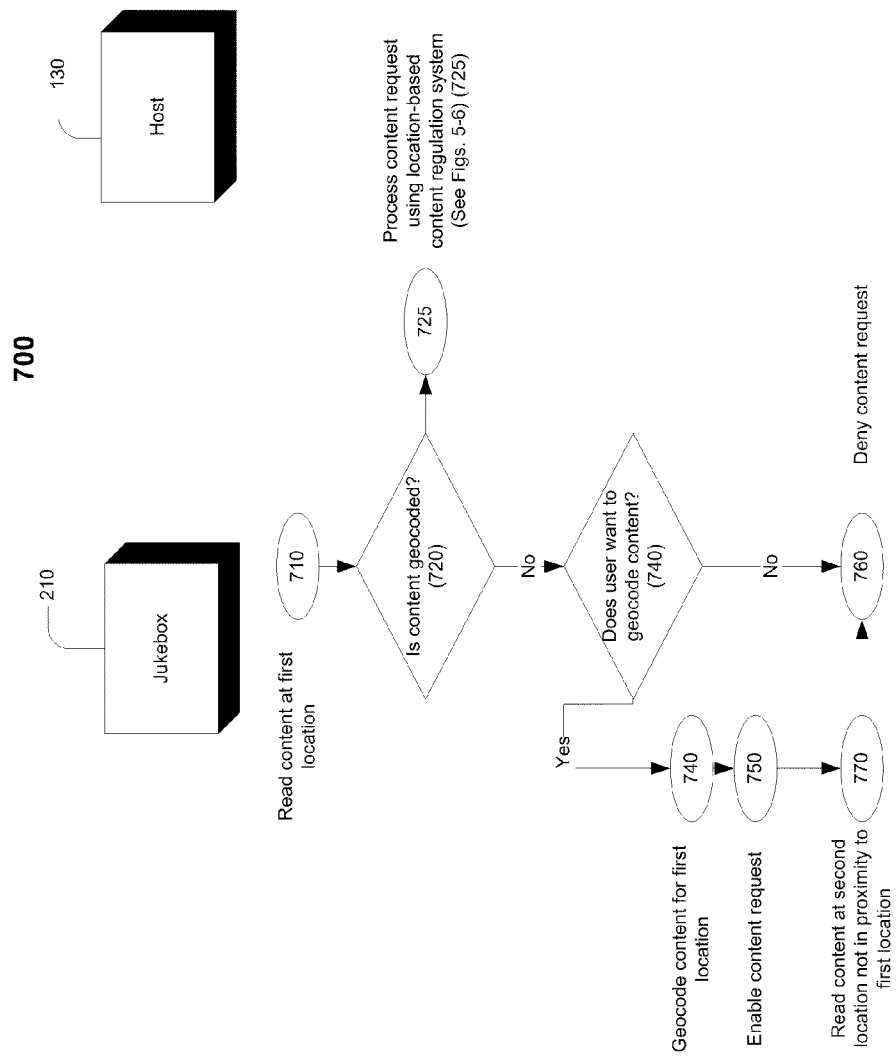
FIG. 7 is a flow chart illustrating an exemplary process by which a content selection may be enrolled in a location-based content regulation system.

Referring to FIG. 7, a flow chart 700 illustrates an exemplary process by which a content selection may be enrolled in a location-based content regulation system. For ease of discussion, particular components described with respect to FIG. 1 are referenced as performing the operations shown in flow chart 700. However, similar methodologies may be applied in other implementations where different components are used to define the structure of the system, or where the functionality is distributed differently among the components shown by FIG. 1. The flow chart 700 illustrates how a content selection not geocoded, that is, not previously associated with a geographic location, may be geocoded to participate in a location-based content regulation system to enable access to the content selection.

Initially, the jukebox 210 reads the content selection at a first location (710). The jukebox 210 determines if the selection is geocoded (720). If so, the jukebox 210 may regulate access to the selection using the operations described previously with respect to FIGS. 5-6 (725). If not, the jukebox 210 polls the user to determine if the user wants to geocode the content (730). If so, the jukebox 210 geocodes the content with a location (740).

In one example, the location of the content access system is used as the location to which the content is geocoded. In another example, the user is prompted to enter location information. The user may be prompted to enter an address. The jukebox 210, working either alone or in conjunction with the host 130, may translate the address or information provided to a coordinate location so that the coordinate location may be geocoded as the permissible location for the content selection. With the content selection geocoded, the content request is enabled (750).

If the user does not geocode the content, the jukebox 210 denies the content request (760). Similarly, if the user attempts to execute a content request at a second location different than the permissible location associated with the content selection (770), the content request is denied (760).

Although flow chart 700 describes a jukebox 210 that allows the content to be geocoded with one location, other systems may allow the permissible location to be specified for multiple locations and/or multiple devices. Thus, a jukebox 210 could accommodate a user who accessed the same content selection at a primary residence, a summer home, and a winter home.

In one example, allowing the user to geocode content may reduce the operations that a content provider is required to perform in advance of distributing the content selection. A content provider can distribute a content selection without specifying a permissible location for the content selection. By allowing the user to geocode the content selection, the content provider may reduce the complexity of manufacturing operations in that the permissible location does not need to be gathered and associated with a content selection. In addition, inventory management may be simplified, as a particular content selection is not restricted to a specified permissible location and may be sold a larger customer community than the customer community associated with a specified permissible location.

Figure 8:
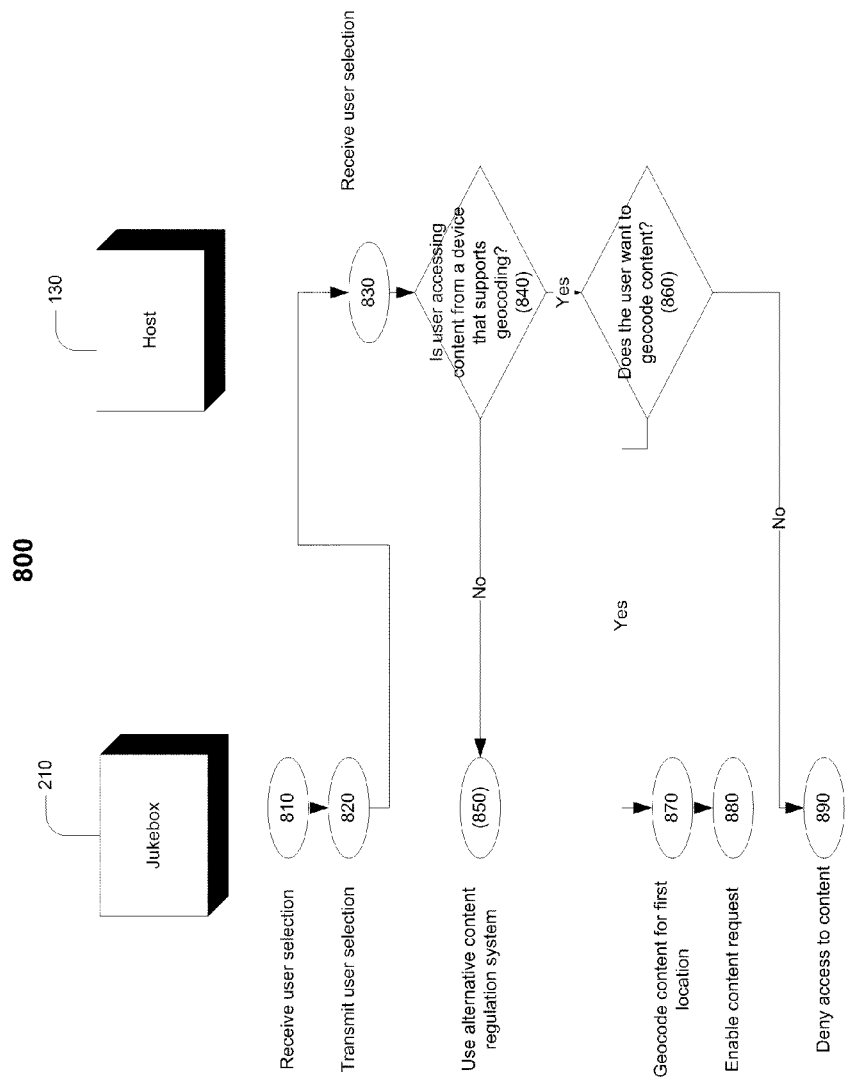
FIG. 8 is a flow chart illustrating an exemplary process by which a location-based content regulation system may be registered in a content regulation system

Referring to FIG. 8, a flow chart 800 illustrates an exemplary process by which a location-based content regulation system may be registered in a content regulation system. For example, the flow chart 800 illustrates how the location-based content regulation system may be used for devices associated with a fixed location while alternative content regulation systems may be used for mobile devices such as a car stereo or miniature electronic device. For ease of discussion, particular components described with respect to FIG. 1 are referenced as performing the operations shown in flow chart 800. However, similar methodologies may be applied in other implementations where different components are used to define the structure of the system, or where the functionality is distributed differently among the components shown by FIG. 1.

Initially, a jukebox 210 receives a user selection (810). The user selection is then transmitted to the host 130 (820). This may include framing the user selection as a content request. The host 130, in turn, receives the user selection (830).

The host 130 determines if the user is accessing the content from a device that supports geocoding (840). If not, the jukebox 210 uses an alternative content regulation system to process the content request (850). For example, the host 130 may determine that the user is accessing the content from a car stereo that cannot be incorporated into an existing location-based content regulation system. Accordingly, the car stereo may participate in a content regulation system oriented to a serial number for the content selection. By using a location-based content regulation system where appropriate and using other content regulation systems in other instances, the host 130 allows the location-based regulation system to be used where appropriate while reducing the interruption a user may experience where performance of the location-based regulation system is uncertain or problematic or where another content regulation may achieve superior results without the risk of user interruption.

If the jukebox 210 supports the location-based content regulation system, the host may determine if the user wants to geocode content (860). If so, the jukebox 210 geocodes the content selection for the first location (870), and enables the content request (880). If not, the host 130 may instruct the jukebox 210 to deny access to the content selection (890).

Referring to FIG. 9, a flow chart 900 illustrates an exemplary process by which a jukebox 210 may participate in a location-based content regulation system in an environment that includes multiple content regulation systems. For ease of discussion, particular components described with respect to FIG. 1 are referenced as performing the operations shown in flow chart 900. However, similar methodologies may be applied in other implementations where different components are used to define the structure of the system, or where the functionality is distributed differently among the components shown by FIG. 1.

Initially, the jukebox 210 receives a user selection (910). The jukebox 210 determines if the user is accessing the content from a device that supports geocoding (915). If not, the jukebox 210 may use an alternative content regulation system (920). This may include enabling temporary or limited access to the content selection until the user participates in a location-based content regulation system. If the jukebox 210 does support geocoding, the jukebox 210 may identify a jukebox location (925). For example, the jukebox 210 may use a GPS receiver to identify the jukebox location for the jukebox 210. The jukebox 210 then determines the permissible location for the content (930), and relates the jukebox location to the permissible location (935). When the permissible location supports the jukebox location (940), the content request is enabled (945). If not, the content request may be denied.

Other implementations are within the scope of the following claims. For example, a location-based content regulation system may use different permissible locations that relate to different operating environments. For example, an optical disk being accessed by a fixed optical disk player may be limited to operating in a smaller geographic region. However, when the optical disk is accessed by an optical disk player in a car stereo, the optical disk may be accessible in a larger geographic region. This may include enabling the optical disk player in the car stereo to access the optical disk throughout a state or multistate region. Another implementation may include associating the optical disk with a counter or timer that enables the optical disk to be in additional regions so long as the optical disk player is accessed a specified percentage of time (e.g., 80%) from a base region or home location. Still other implementations may feature a tiered regulation system where wider access to content is available under a different or more comprehensive licensing plan. Thus, a user that requires nationwide access to content may be required to purchase a more expensive license to support their content access needs.

Although the systems and operations have been described using a jukebox, the label 'jukebox' may include a number of content access systems that appear in different forms. For example, the operations described previously may be used in a digital cinema system in a theater, a personal computer, a wireless phone, and/or other device. Additionally, the operations described previously also may be used to accommodate a mobile appliance (e.g., a car stereo) in conjunction with other content licensing/management systems. For example, the operations described previously may be invoked when other management systems are problematic. For example, the content may be licensed and authorized on particular serial numbers of mobile appliances. If the content is no longer being accessed on the mobile appliance, the location-based regulation system may be used. Thus, an optical disk may be electronically tied a car stereo and a miniature reader. When the optical disk is no longer read from the mobile device, access to the optical disk may be regulated using the location of a jukebox.

Although an optical disk was described in some of the examples, other physical media or electronic files themselves may be regulated similarly.

What is claimed is:

1. A method of enabling a wireless device to access content on a host, the method comprising:
   receiving, from a wireless device and across a wireless communications network, a content request from an application on the wireless device that administers a content regulation system;
   receiving, in association with the content request and from the wireless device, a coordinate location for the wireless device from the application on the wireless device that administers the content regulation system;
   determining whether the wireless device is permitted to access content associated with the content request;
   enabling the wireless device to access the content;
   generating, based on the coordinate location, a permissible location for the wireless device to access the content;
   storing an association between the content and the permissible location, the association enabling identification of the permissible location based on the content; and
   configuring the content regulation system to identify, using the association, the permissible location so that the content may be accessed by the application within the identified permissible location.

2. The method of claim 1, wherein receiving the content request includes receiving a description of the content and a user identifier.

3. The method of claim 1, wherein the permissible location is a region within a radius around the coordinate location.

4. The method of claim 1, wherein the permissible location is a street address based on the coordinate location.

5. The method of claim 1, wherein the association is stored in a database that relates an identifier of the content to the permissible location.

6. A non-transitory computer-readable medium including program instructions for performing, when executed by at least one processor, a method comprising:
   receiving, from a wireless device, a content request from an application on the wireless device that administers a content regulation system;
   receiving, in association with the content request and from the wireless device, a coordinate location for the wireless device from the application on the wireless device that administers the content regulation system;

determining whether the wireless device is permitted to access content associated with the content request;

enabling the wireless device to access the content;

generating, based on the coordinate location, a permissible location for the wireless device to access the content;

storing an association between the content and the permissible location, the association enabling identification of the permissible location based on the content; and configuring the content regulation system to identify, using the association, the permissible location so that the content may be accessed by the application within the identified permissible location.

7. The computer-readable medium of claim 6, wherein receiving the content request includes receiving a description of the content and a user identifier.

8. The computer-readable medium of claim 6, wherein the permissible location is a region within a radius around the coordinate location.

9. The computer-readable medium of claim 6, wherein the permissible location is a street address based on the coordinate location.

10. The computer-readable medium of claim 6, wherein the association is stored in a database that relates an identifier of the content to the permissible location.

11. A method of accessing content on a host, the method comprising:

sending, from a wireless device, a content request to a host;

sending, in association with the content request and from the wireless device, a coordinate location for the wireless device to the host;

identifying, based on content associated with the content request, a permissible location for the wireless device to access the content, the permissible location generated by the host based on the coordinate location, wherein an association, stored by the host, between the content and the permissible location enables the identification of the permissible location; and accessing the content within the identified permissible location.

12. The method of claim 11, wherein sending the content request includes sending a description of the content and a user identifier.

13. The method of claim 11, wherein the permissible location is a region within a radius around the coordinate location.

14. The method of claim 11, wherein the permissible location is a street address based on the coordinate location.

15. The method of claim 11, wherein the association is stored in a database that relates an identifier of the content to the permissible location.

16. An apparatus for accessing content on a host, the apparatus comprising:

a processor; and a computer-readable medium storing instructions which cause the processor to:

send, from a wireless device, a content request to a host;

send, in association with the content request and from the wireless device, a coordinate location for the wireless device to the host;

identify, based on content associated with the content request, a permissible location for the wireless device to access the content, the permissible location generated by the host based on the coordinate location, wherein an association, stored by the host, between the content and the permissible location enables the identification of the permissible location; and access the content within the identified permissible location.

17. The apparatus of claim 16, wherein sending the content request includes sending a description of the content and a user identifier.

18. The apparatus of claim 16, wherein the permissible location is a region within a radius around the coordinate location.

19. The apparatus of claim 16, wherein the permissible location is a street address based on the coordinate location.

20. The apparatus of claim 16, wherein the association is stored in a database that relates an identifier of the content to the permissible location.

* * * * *